DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 4, 1973

917 O.G. 11

T917,012

PVC-CONTAINING BLENDS AND FILMS THEREOF

Tibor G. Mahr, Wilmington, Del., assignor to E. I. du Pont de Nemours and Company, Wilmington, Del.

Continuation of application Ser. No. 321,577, Jan. 8, 1973, which is a continuation of application Ser. No. 169,798, Aug. 6, 1971. This application June 11, 1973, Ser. No. 369,114

Int. Cl. C08f *45/52*

U.S. Cl. 260—28.5 D

No Drawing. 10 Pages Specification

Improvement in blends of PVC and ethylene/carbon monoxide copolymers wherein minor amounts of an aliphatic petroleum hydrocarbon tackifying resin or microcrystalline wax are added to promote processability without serious loss of mechanical properties and yield films of high clarity.